United States Patent
Auriol et al.

(10) Patent No.: US 8,950,626 B2
(45) Date of Patent: Feb. 10, 2015

(54) DEVICE FOR STORING AND DISPENSING SMALL PARTS SUCH AS RIVETS

(75) Inventors: Pierre Auriol, Flourens (FR); Jean-Marc Auriol, Flourens (FR)

(73) Assignee: Eris Sarl, Flourens (FR)

( * ) Notice: Subject to any disclaimer, the term of this patent is extended or adjusted under 35 U.S.C. 154(b) by 783 days.

(21) Appl. No.: 12/811,786

(22) PCT Filed: Dec. 22, 2008

(86) PCT No.: PCT/FR2008/052403
§ 371 (c)(1),
(2), (4) Date: Jul. 27, 2010

(87) PCT Pub. No.: WO2009/087333
PCT Pub. Date: Jul. 16, 2009

(65) Prior Publication Data
US 2010/0282771 A1    Nov. 11, 2010

(30) Foreign Application Priority Data

Jan. 7, 2008  (FR) ...................... 08 50062

(51) Int. Cl.
| | | |
|---|---|---|
| *B65D 83/00* | (2006.01) | |
| *B65G 47/06* | (2006.01) | |
| *B21J 15/32* | (2006.01) | |
| *B23P 19/00* | (2006.01) | |

(52) U.S. Cl.
CPC ................ *B65G 47/06* (2013.01); *B21J 15/32* (2013.01); *B23P 19/005* (2013.01)
USPC .......................................... 221/278; 221/208

(58) Field of Classification Search
USPC .................. 221/174, 208, 278, 281, 286, 306
See application file for complete search history.

(56) References Cited

U.S. PATENT DOCUMENTS

| | | | | |
|---|---|---|---|---|
| 3,625,570 A | * | 12/1971 | Ford ............................... | 406/137 |
| 5,143,216 A | * | 9/1992 | Aurtoi et al. ................... | 206/338 |
| 5,143,253 A | * | 9/1992 | Takahashi et al. ............. | 221/197 |
| 5,181,315 A | | 1/1993 | Goodsmith | |
| 5,733,089 A | | 3/1998 | Albright | |
| 5,806,715 A | * | 9/1998 | Hamuro et al. ................ | 221/174 |
| 6,443,669 B2 | * | 9/2002 | Saito .............................. | 406/28 |
| 6,669,435 B2 | * | 12/2003 | Bertsch et al. ................ | 414/811 |
| 6,796,931 B2 | * | 9/2004 | Cortigiano, Sr. .............. | 493/213 |
| 6,932,544 B2 | | 8/2005 | McMahon et al. | |
| 6,986,450 B2 | | 1/2006 | Matthews et al. | |
| 2008/0164202 A1 | * | 7/2008 | Graham ......................... | 210/457 |

FOREIGN PATENT DOCUMENTS

FR          2 640 245 A       6/1990

OTHER PUBLICATIONS

International Search Report, Jun. 4, 2009, from International Phase of the instant application.

* cited by examiner

*Primary Examiner* — Gene Crawford
*Assistant Examiner* — Kelvin L Randall, Jr.
(74) *Attorney, Agent, or Firm* — Jackson Patent Law Office

(57) ABSTRACT

The invention relates to a device (D) for storing and dispensing parts (P) of the type that comprises a rigid parallelepiped container (100) receiving at least one winding of a flexible storage pipe (200), wherein at least one end (220) of said pipe (200) opens to the outside and said end (220) is provided with a dispensing head (300), while the other end (210) is supplied with movement fluid, characterized in that the pipe (200) used for storing the parts (P) is made of a polyether-based polyurethane of about 64 shore D.

15 Claims, 2 Drawing Sheets

DEVICE FOR STORING AND DISPENSING SMALL PARTS SUCH AS RIVETS

FIELD OF APPLICATION OF THE INVENTION

This invention relates to the field of storage and dispensing of small parts such as rivets and in particular the adaptations enabling these functions to be performed under the best conditions.

DESCRIPTION OF THE PRIOR ART

The prior art includes a number of storage and dispensing means for parts such as rivets. These devices are intended in particular to provide intermediate storage for parts of the same sizes and in the same position for the purpose of supplying a riveting effector.

These devices are filled by means of filling machines ensuring, at the outlet of the vibrating bowl, the control of the positioning. They can be used separately or grouped together so as to provide the dispensing circuit with which they are associated a large number of parts to be dispensed or a plurality of models of parts to be dispensed. The dispensing is performed unitarily.

An example of storage and dispensing means is described in document FR 2640245.

The invention relates more specifically to a storage and dispensing device of the type including a rigid parallelepiped container receiving at least one winding of a flexible storage tube, in which at least one end of said tube opens externally, in which said end is equipped with a dispensing head and the other end is supplied with transport fluid for the purpose of moving the parts.

The applicant has observed that a plurality of parameters were capable of being optimized, including:
  the material of the tube must combine flexibility with hardness to allow winding without folding and facilitate movement;
  the turns from one winding layer to the next must be linked while allowing relative elasticity to prevent jamming;
  the dispensing head must be capable of being detached from the container without disassembly of the assembly;
  the supply of movement fluid must be simplified;
  etc.

The choice of the material of the tube becomes more important as hollow core thereof can adopt a polygonal profile as it has a different thickness according to its angular areas, which can contribute to undesirable fragilization and deformation.

DESCRIPTION OF THE INVENTION

Based on this fact and a set of pre-established specifications, the applicant conducted research aimed at optimizing the operation of such storage and dispensing means.

This research resulted in the particular design of a device for storing and dispensing parts of the type including a rigid parallelepiped container receiving at least one winding of a flexible storage tube, in which at least one end of said tube opens externally, in which said end is equipped with a dispensing head and the other end is supplied with movement fluid.

According to the invention, the device is notable in that the tube used to store parts is made of polyurethane based on polyether of around 64 shore D. This hardness enables, in the winding radius and according to the diameter of the tube, the flexibility and the hardness to be obtained that are necessary for winding without folds or flattening, which would present an obstacle to proper movement of parts such as rivets. Moreover, such a hardness provides a sliding surface without a high friction coefficient inside the tube, thus satisfying the objectives of the invention. Such a hardness also ensures the resistance necessary to prevent the bursting of the tube, which is supplied with pressurized fluid such as compressed air. Such a hardness also has the advantage of avoiding any surface treatment in the hollow core of the tube so as to allow free circulation of the parts therein.

According to another particularly advantageous feature of the invention, the tube is wound over a plurality of horizontal layers, and the connection between the various layers is obtained by adhesive means. The use of such means, such as an adhesive strip between the layers, ensures the flexibility necessary in the connection between the turns, as well as a regularly uniform radius of curvature over the length of the tube for good circulation of the parts.

According to another particularly advantageous feature of the invention, during assembly of the device, the tube is wound flatly from the outside to the inside. The windings are arranged in horizontal layers between which said adhesive means are preferably positioned. In addition, the smallest winding diameter is carefully calculated so that the tube has a radius of curvature allowing for the movement of the parts. The largest diameter is defined by the frame formed by the parallelepiped of the container.

According to another particularly advantageous feature of the invention, the part outlet end is equipped with a dispensing head of which the unitary dispensing components are implemented by the same fluid as that intended for transporting parts. To simplify the transport fluid supply at the other end of the winding, a conduit establishes communication between the fluid supply circuit of the dispensing head and the other end of the winding so that a single supply nozzle is necessary for the two functions: control of unitary dispensing of parts at the tube outlet and movement of the parts in the tube.

According to another particularly advantageous feature of the invention, the design of the unitary dispensing head facilitates the disassembly thereof for maintenance or changing purposes, without requiring disassembly of the cassette.

As the basic concepts of the invention have been disclosed above in their most basic form, other details and features will become clearer in view of the following description and in reference to the appended drawings, with, as a non-limiting example, an embodiment of a device according to the invention.

DESCRIPTION OF PREFERRED EMBODIMENTS

Figure 1:
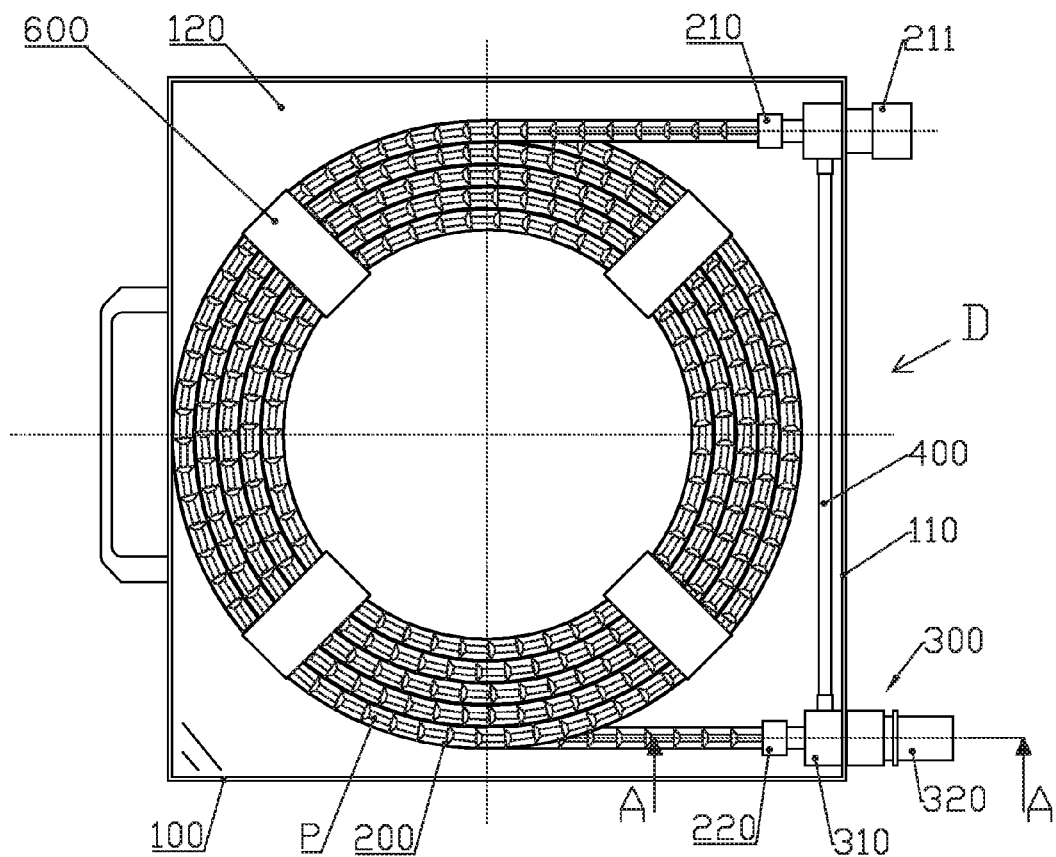
FIG. 1 is a top view of an embodiment of a storage and dispensing device according to the invention.
Figure 4:
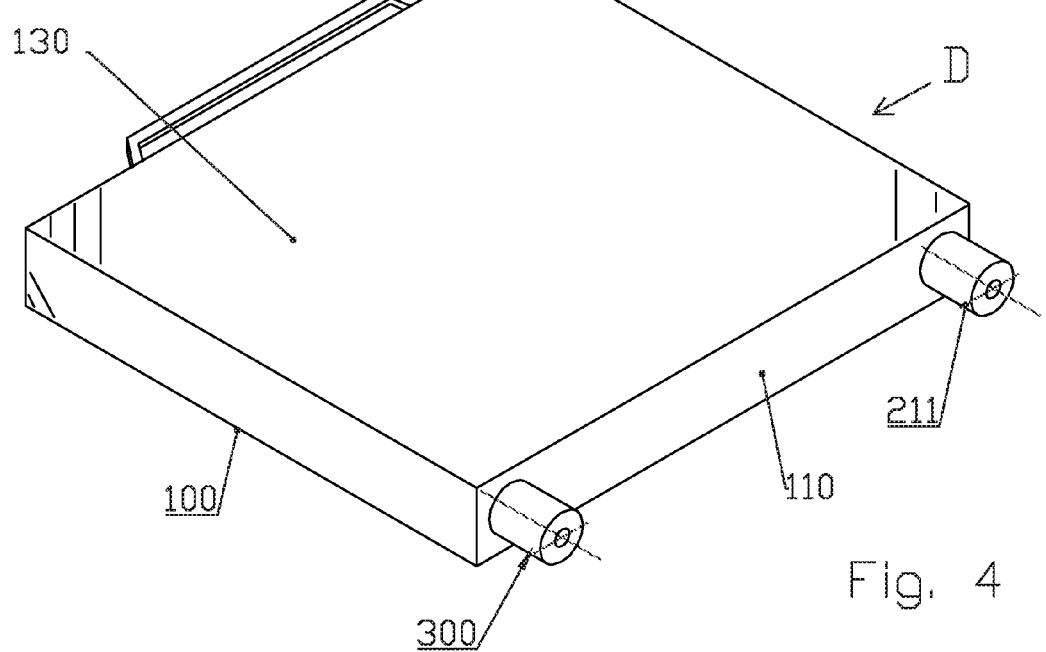
FIG. 4 is an external perspective view of the device of FIG. 1.

As shown in the drawing of FIG. 1, the storage and dispensing device of the invention referenced D as a whole is of the type including a rigid parallelepiped container referenced 100 receiving a plurality of windings of a flexible storage tube 200. As shown, an end 210 of said tube leads outside through an end of a vertical face 110 of the parallelepiped formed by the container 100, and the other end leads to the other end of said vertical face 110; this end 220 is equipped with a dispensing head 300 and the other end 210 is supplied with transport fluid.

According to a technological choice of the invention, the first end 210 of the tube 200 is used to fill the device D with parts P, then it is closed off by closure means 211.

To ensure the movement of parts P inside the tube 200, a movement fluid, for example, compressed air, is introduced at this end 210.

This supply of movement fluid was the subject of particular attention for optimization in order to reduce the number of components necessary for implementation thereof. Thus, according to a particularly sound feature of the invention, a compressed air supply conduit 400 establishes communication between the supply conduit for controlling the dispensing nozzle 300 and the end 210. This feature enables only one compressed air intake to be required to ensure both control of the dispensing nozzle 300 and to ensure the movement of the parts P.

According to another particularly advantageous feature, this conduit 400 is arranged inside the chamber defined by the container 100, thereby guaranteeing protection thereof.

Figure 2:
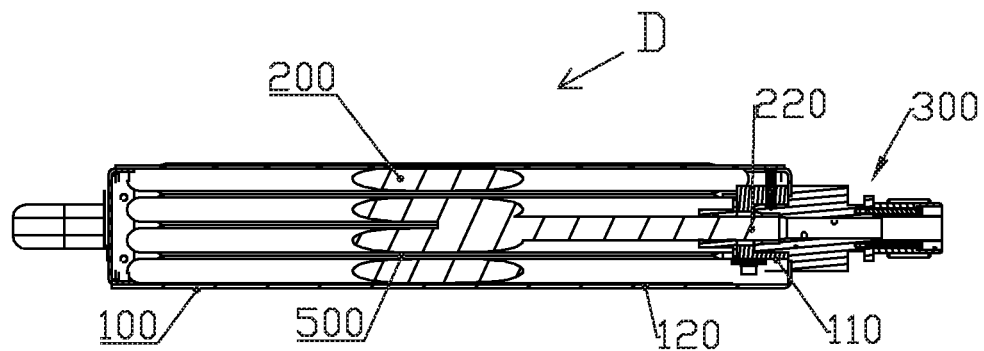
FIG. 2 is a cross-sectional side view according to the A-A section of the device of FIG. 1.

According to another particularly advantageous feature of the invention shown by the drawing of FIG. 2, the tube 200 is wound flatly from the outside to the inside over a plurality of horizontal layers, in which the connection between the various layers is achieved by adhesive means. According to a preferred embodiment, the first layer is attached to the base 120 of the container 100 by means of a double-sided adhesive strip, not shown. Such an adhesive strip 500 is also used to attach the layers to one another. In addition, in order for the windings and the turns produced to preserve their shape, a one-sided adhesive strip or a material collar 600 clamps, without deforming, the turns and the windings together.

The dispensing head 300 of the device D was also the subject of particular attention in its design so as to enable the disassembly thereof for maintenance or replacement purposes, without requiring disassembly of the device D.

Figure 3:
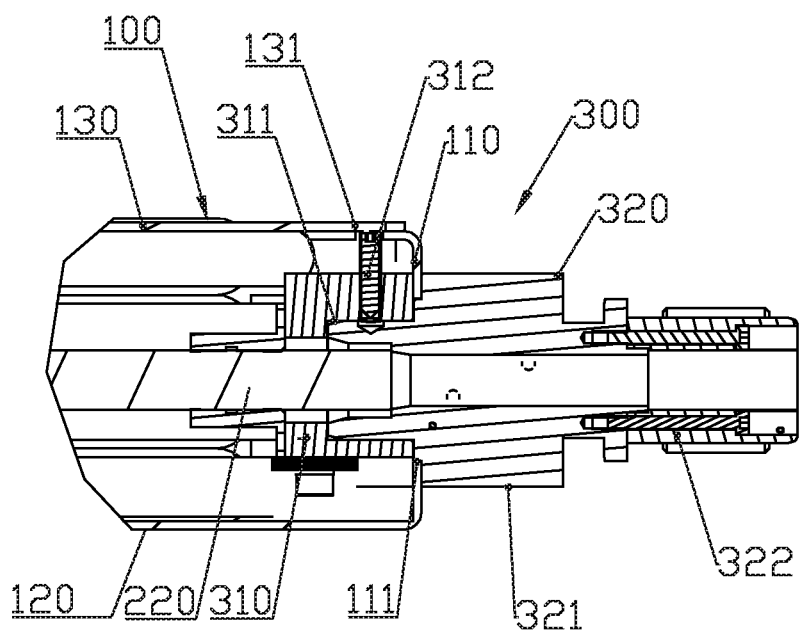
FIG. 3 is a cross-sectional side view of the detail of the dispensing head.

To do this, the dispensing head 300 as shown in the drawing of FIG. 3 includes two portions:

a first internal portion 310, which, receiving the end 220 of the tube 200, is attached to the container 100 and is arranged coaxially to the orifice 111 formed in the wall 110 of the container 100 for the outlet of parts P from the tube 200 toward the outside, a second external portion 320, which, attached to the internal portion 310 by passing through the orifice 111, has a hollow core and is equipped with the unitary dispensing module 321 ensuring the unitary outlet of parts P and communicates with the pressurized fluid supply by means of an end piece 322 preformed for this purpose.

To make the external portion 320 retractable, the internal portion 311 comprises a cylindrical recess 311 coaxial to the axis of the outlet for parts P with which an external cylindrical form 322 of the external portion 320 is introduced. To hold this cylindrical connection in position, an attachment screw 312 passes through the internal portion 310 to reach the cylindrical housing 311 and bear on the cylindrical form 322. The internal portion 310 and the thread thereof are arranged so that the screw head can be accessible from the outside of the container by an orifice 131 provided for this purpose in the upper face 130 of the container 100.

The screwing or unscrewing of the screw 312 thus enables the external portion 320 of the dispensing nozzle 300 to be attached or released without disassembling the container 100 and without freeing the end 220 of the tube 200, which thus remains blocked in position during the disassembly or assembly operations of this highly technical portion of the dispensing nozzle 300.

According to a preferred embodiment, the upper face 130 of the container 100 is made of a transparent material providing visual access to the contents of the device D. Indeed, according to the invention, at least one wall or face of the container 100 is made at least partially of a transparent material. Indeed, associated with the fact that the storage tube 200 is made of a transparent material, the device makes it possible to determine at any time, by visual monitoring, the filling rate or the type of parts stored.

It is understood that the device has been described and shown above for the purpose of disclosure rather than as a limitation. Of course, various arrangements, modifications and improvements may be made to the example above, without going beyond the scope of the invention.

The invention claimed is:

1. A device for storing and dispensing parts, the device comprising:
   a rigid parallelepiped container defining an interior;
   a flexible storage tube configured to define a winding, the tube being in the interior of the container, the tube including polyurethane based on polyether, the tube defining an interior, configured to accommodate the parts, a first end, and a second end;
   a dispensing head on the first end of the tube; and
   a conduit establishing communication between the dispensing head and the second end of the tube, the conduit bypassing the winding of the tube, whereby a single nozzle, supplying pressurized fluid, provides both movement of the parts in the tube and control of the dispensing head.

2. A device according to claim 1, wherein the dispensing head includes:
   a first portion, receiving the end of the tube, the first portion being attached to the container and arranged coaxially to an orifice formed in the container for dispensing of parts from the tube toward the outside, and
   a second portion attached to the first portion via the orifice, the second portion having a hollow core and being equipped with a unitary dispensing module ensuring unitary dispensing of parts.

3. A device according to claim 1, wherein a wall or face of the container is made at least partially of a transparent material.

4. A device according to claim 1, wherein the tube is transparent.

5. A device according to claim 1, wherein the tube is wound flatly from the outside to the inside.

6. A device according to claim 1, wherein a smallest internal diameter of the winding allows movement of parts.

7. A device according to claim 1, wherein the tube is wound flatly over a plurality of horizontal layers, and a connection between the horizontal layers is effected by adhesive means.

8. A device according to claim 2, wherein the dispensing head is configured for unitary dispensing.

9. A device according to claim 2, wherein a wall or face of the container is made at least partially of a transparent material.

10. A device according to claim 2, wherein the tube is transparent.

11. A device according to claim 2, wherein the tube is wound flatly from the outside to the inside.

12. A device according to claim 2, wherein a smallest internal diameter of the winding allows movement of parts.

13. A device according to claim 1 wherein the conduit is in the interior of the container.

14. A device according to claim 1 further including a handle on an exterior of the container.

15. A device according to claim 1 further including a handle on an exterior of the container, wherein the conduit is in the interior of the container.

* * * * *